(12) United States Patent
Clemons et al.

(10) Patent No.: US 9,333,570 B2
(45) Date of Patent: May 10, 2016

(54) REVERSIBLE BOLT-ON PIERCING TIP

(75) Inventors: John Kevin Clemons, Wamego, KS (US); Jeffrey R. Peterson, Wamego, KS (US); John M. Stamey, Manhattan, KS (US)

(73) Assignee: Caterpillar Inc., Peoria, IL (US)

( * ) Notice: Subject to any disclaimer, the term of this patent is extended or adjusted under 35 U.S.C. 154(b) by 1902 days.

(21) Appl. No.: 11/862,982

(22) Filed: Sep. 27, 2007

(65) Prior Publication Data

US 2008/0072434 A1    Mar. 27, 2008

Related U.S. Application Data

(60) Provisional application No. 60/827,212, filed on Sep. 27, 2006.

(51) Int. Cl.
*B23D 17/00* (2006.01)
*B23D 35/00* (2006.01)
*E02F 3/96* (2006.01)

(52) U.S. Cl.
CPC .............. *B23D 35/001* (2013.01); *B23D 17/00* (2013.01); *B23D 35/002* (2013.01); *B23D 35/008* (2013.01); *E02F 3/965* (2013.01); *Y10S 83/955* (2013.01); *Y10T 83/9447* (2015.04)

(58) Field of Classification Search
CPC .... B23D 17/00; B23D 35/001; B23D 35/002; B23D 35/008; B23B 27/164; B23C 5/12; B27L 11/005; E02F 3/965; Y10S 83/955; Y10T 83/9447
USPC .............. 30/134, 135, 236, 260, 349; 83/955, 83/840–844, 694; 241/101.73; 407/113
See application file for complete search history.

(56) References Cited

U.S. PATENT DOCUMENTS

| | | | |
|---|---|---|---|
| 331,934 A | * | 12/1885 | Aiken ................. B23D 35/002 30/349 |
| 402,381 A | | 4/1889 | Aiken |
| 3,971,131 A | | 7/1976 | Boyajian et al. |
| 4,399,730 A | | 8/1983 | Oswalt, Jr. |
| 4,676,000 A | | 6/1987 | James |
| 4,717,083 A | | 1/1988 | Quast et al. |
| 4,776,093 A | | 10/1988 | Gross |
| 4,909,109 A | | 3/1990 | Crane |
| 4,934,616 A | | 6/1990 | Zepf |
| 5,142,779 A | | 9/1992 | LaBounty |
| 5,183,216 A | | 2/1993 | Wack |

(Continued)

FOREIGN PATENT DOCUMENTS

| | | |
|---|---|---|
| DE | 40 38 434 | 6/1992 |
| EP | 0 666 131 A1 | 8/1995 |

(Continued)

*Primary Examiner* — Clark F Dexter
(74) *Attorney, Agent, or Firm* — Finnegan, Henderson, Farabow, Garrett & Dunner, LLP

(57) ABSTRACT

A piercing tip assembly has two piercing tips, each having two sets of piercing and shearing edges. The tip is reversible so that the tip can be detached from the shears, its orientation changed, and replaced on the shears so a fresh, sharp set of piercing and shearing edges is exposed during use. The tips are reverse by rotating each tip and replacing the tip mounted on the right side of the jaw, and switching the tip on the left side of the jaw to the right side, and the tip on the right side of the jaw to the left side. The piercing tip assembly protects a substantial portion of the upper jaw of a metal shears from wear.

6 Claims, 7 Drawing Sheets

(56) References Cited

U.S. PATENT DOCUMENTS

| | | |
|---|---|---|
| 5,187,868 A | 2/1993 | Hall |
| 5,211,212 A | 5/1993 | Carlson et al. |
| 5,230,151 A | 7/1993 | Kunzman et al. |
| 5,263,654 A | 11/1993 | Young |
| 5,339,525 A | 8/1994 | Morikawa |
| 5,385,311 A | 1/1995 | Morikawa et al. |
| 5,461,784 A | 10/1995 | Baron |
| 5,533,682 A | 7/1996 | de Gier et al. |
| 5,586,843 A * | 12/1996 | Minicozzi ............... 407/42 |
| 5,669,141 A | 9/1997 | Morikawa et al. |
| 5,769,341 A | 6/1998 | Morikawa et al. |
| 5,873,168 A | 2/1999 | Johnson et al. |
| 5,894,666 A * | 4/1999 | Hrusch ............... 30/134 |
| 5,950,945 A | 9/1999 | Schaller |
| 5,975,812 A * | 11/1999 | Friedman ............... 407/114 |
| 5,987,750 A | 11/1999 | Tally |
| 5,992,023 A | 11/1999 | Sederberg et al. |
| 6,119,970 A | 9/2000 | LaBounty et al. |
| 6,810,783 B1 * | 11/2004 | Larose ............... 83/840 |
| 6,839,969 B2 | 1/2005 | Jacobson et al. |
| 7,004,413 B2 | 2/2006 | Langlois |
| 7,069,969 B2 * | 7/2006 | Knappett et al. ...... B27G 13/005 144/176 |
| 7,222,808 B2 | 5/2007 | Edwards |
| 7,240,869 B2 | 7/2007 | Sederberg et al. |
| 7,293,729 B2 | 11/2007 | Ragnarsson |
| 7,464,473 B2 | 12/2008 | Fladgard et al. |
| 8,146,256 B2 * | 4/2012 | Johnson et al. ...... B23D 31/008 241/101.73 |
| 2003/0015254 A1 * | 1/2003 | Hinchliff ............... B27L 11/005 144/241 |
| 2003/0019543 A1 * | 1/2003 | Schuh et al. .......... B27L 11/005 144/176 |
| 2005/0091852 A1 | 5/2005 | Johnson et al. |
| 2005/0115076 A1 | 6/2005 | Jacobson et al. |
| 2005/0235498 A1 | 10/2005 | Cossette et al. |
| 2005/0262700 A1 | 12/2005 | Alseth et al. |
| 2007/0130776 A1 * | 6/2007 | Grant et al. ............... 30/134 |

FOREIGN PATENT DOCUMENTS

| | | |
|---|---|---|
| EP | 0651683 | 10/1995 |
| EP | 0 768 137 | 4/1997 |
| EP | 1 113 111 | 7/2001 |
| EP | 1545821 A1 | 6/2005 |
| GB | 2 001 273 | 1/1979 |
| GB | 2 321 029 | 7/1998 |
| JP | 62-103943 | 7/1987 |
| JP | 63-79118 | 5/1988 |
| JP | 63-83209 | 6/1988 |
| JP | 1-138611 | 9/1989 |
| JP | 02-075354 | 3/1990 |
| JP | 8-21107 | 1/1996 |
| JP | 8-39333 | 2/1996 |
| JP | 8-112719 | 5/1996 |
| JP | 9-57523 | 3/1997 |
| JP | 9-78856 | 3/1997 |
| JP | 9-217502 | 8/1997 |
| JP | 10-118828 | 5/1998 |
| JP | 10-118835 | 5/1998 |
| JP | 10-159355 | 6/1998 |
| JP | 10-159356 | 6/1998 |
| JP | 2001-58134 | 3/2001 |
| JP | 2003-334718 | 11/2003 |
| WO | WO 93/00193 | 1/1993 |
| WO | WO 03/101653 A1 | 12/2003 |
| WO | WO 2007/069893 | 6/2007 |

* cited by examiner ized to provisional U.S. Patent Application No. 60/827,212, filed Sep. 27, 2006.

REVERSIBLE BOLT-ON PIERCING TIP

This application claims priority to provisional U.S. Patent Application No. 60/827,212, filed Sep. 27, 2006.

TECHNICAL FIELD

The field of this disclosure is powered jaws for shearing or crushing, such as metal shears adapted for mounting on a hydraulic excavator machine for shearing metal, and the removable cutting and piercing elements that are mounted thereon.

BACKGROUND

Metal shears and other similar tools may feature bolt-on piercing tips. In metal shears, the piercing tip is a portion at the distal end of the upper or lower jaw of the shear. The piercing tip often experiences a high rate of wear because of the difficult duty it performs in harsh environments. The wear can cause the piercing tip to lose sharpness, which results in more difficult penetration and shearing. The increased difficulty causes the shear to work harder, requiring more energy and lengthening cycle times, which ultimately can reduce the overall efficiency of the shear.

When the piercing tip wears and loses sharpness, it is advantageous to replace the tip. This is facilitated if the piercing tip components are attached to the shear with bolts or other mechanical fasteners. Bolt-on piercing tips have been proposed and implemented on metal shears, and facilitate replacing a dull tip for a sharp one. For example, a bolt-on piercing tip is disclosed in U.S. Patent Application Publication No. 2005/0091852 A1, published on May 5, 2005 ("the '852 publication"). The piercing tip disclosed therein can be removed from the shear jaw by removing the bolts that hold it in place, and replaced with a fresh, sharp tip.

The '852 publication also discloses a piercing tip with multiple shearing edges so the tip can be used more than once. The piercing tip disclosed therein can be detached from the shear jaw, rotated 180 degrees, and replaced on the same side of shear jaw to expose a fresh, sharp shearing edge for use.

However, the piercing tip in the '852 publication still leaves room for improvement. The piercing tip must also protect the jaw of the shear from wear as much as possible. The geometry of the jaw and piercing tip must also resist the forces on the tip during use, without yielding or excessively fatiguing the steel.

SUMMARY

A shear tip for a metal shears may comprise a central portion joining two distal cutting portions, the two cutting portions each having a piercing edge and a shearing edge, and a plane of symmetry defined by the central portion and two cutting portions and passing through the central portion, where the two cutting portions are symmetrical about the plane of symmetry.

A shear tip for a metal shears may also comprise a central portion joining two distal cutting portions, the two cutting portions each having a piercing edge and a shearing edge, and the central portion and the two cutting portions forming a generally planar outside surface which is "bowtie" shaped.

A set of two piercing tips for a metal shears may comprise a first piercing tip having a central portion joining two distal cutting portions, the two cutting portions each having a piercing edge and a shearing edge, a second piercing tip having a central portion joining two distal cutting portions, the two cutting portions each having a piercing edge and a shearing edge, and wherein the first piercing tip is a mirror image of the second piercing tip.

Metal shears may comprise a jaw assembly having at least one jaw, a first piercing tip mounted to a left side of the jaw, a second piercing tip mounted to a right side of the jaw; and wherein the first and second piercing tips may be reversed by the first piercing tip being removed and replaced in the position of the second piercing tip, and the second piercing tip being removed and replaced in the position of the first piercing tip.

Metal shears may also comprise a jaw assembly having at least one jaw, at least one piercing tip mounted on a side of the jaw, the piercing tip including a pair of cutting portions each having a piercing edge, a pocket formed on the jaw for receiving one of the cutting portions, the cutting portion received in the pocket being an active cutting portion, and a through slot formed in the jaw for receiving the other of the cutting portions, the cutting portion received in the through slot being an inactive cutting portion.

DETAILED DESCRIPTION

Figure 1:
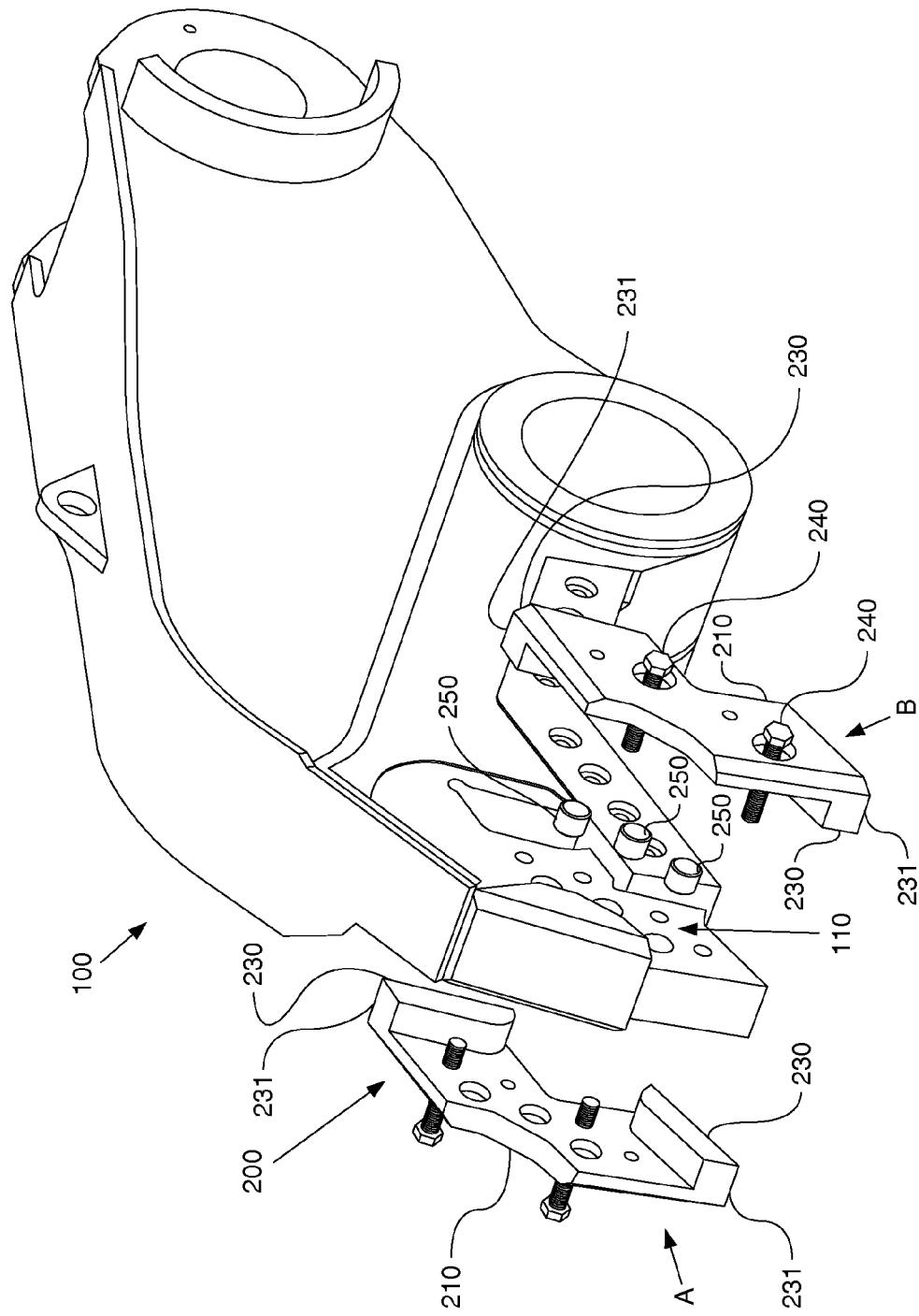
FIG. 1 is an exploded view of the upper jaw of a metal shears with left and right side bolt-on piercing tips.

The following is a detailed description of exemplary embodiments of the invention. The exemplary embodiments described herein and illustrated in the drawing figures are intended to teach the principles of the invention, enabling those of ordinary skill in this art to make and use the invention in many different environments and for many different applications. The exemplary embodiments should not be considered as a limiting description of the scope of patent protection. The scope of patent protection shall be defined by the appended claims, and is intended to be broader than the specific embodiments described herein.

FIG. 1 is an exploded view of a shear upper jaw assembly 100 incorporating a piercing tip assembly 200. The piercing tip assembly 200 is mechanically attached to the upper jaw assembly 100, for easy removal and changing of the tips. The tips in the piercing tip assembly 200 are reusable, having two distinct sets of piercing edges. The tips can be reversed by changing them from a first position to a second position, exposing a fresh set of piercing edges, so that each tip can be used twice before replacement. In the illustrated embodiment, the tips in the piercing tip assembly 200 are mirror images of one another, so the costs of development and production of different left and right versions of the tips are avoided. The piercing tip assembly 200 also provides a high level of protection for the upper jaw assembly 100, covering a large portion of surfaces that would otherwise be subject to wear during use of the shear.

In the illustrated embodiment, the piercing tip assembly 200 comprises two mirror image piercing tips 210. For simplicity in explanation, the two separate tips 210 will be described by referring to only one of the tips.

Figure 6:
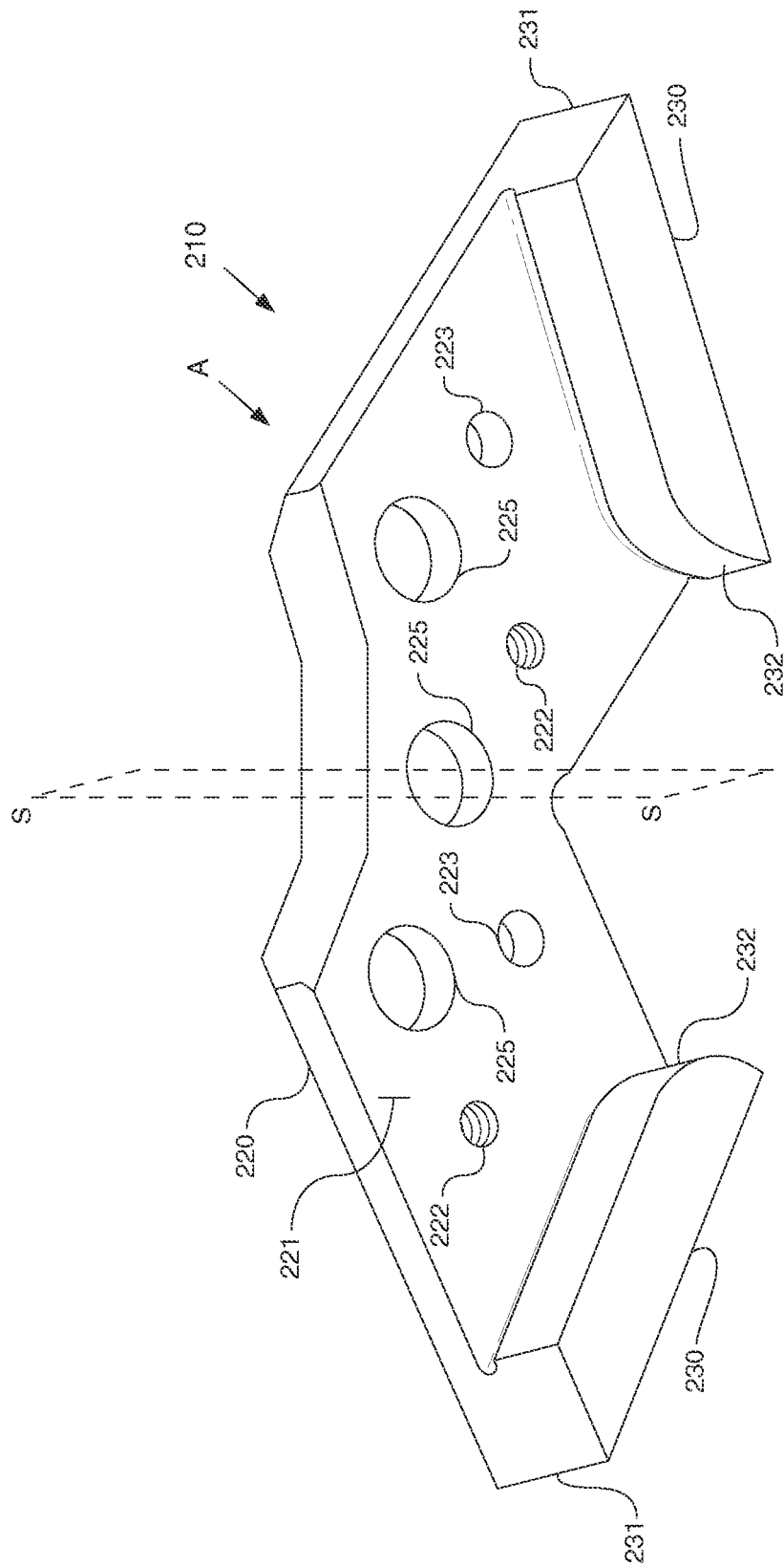
FIG. 6 is a perspective view of one of the bolt-on piercing tips of FIG. 1.
Figure 7:
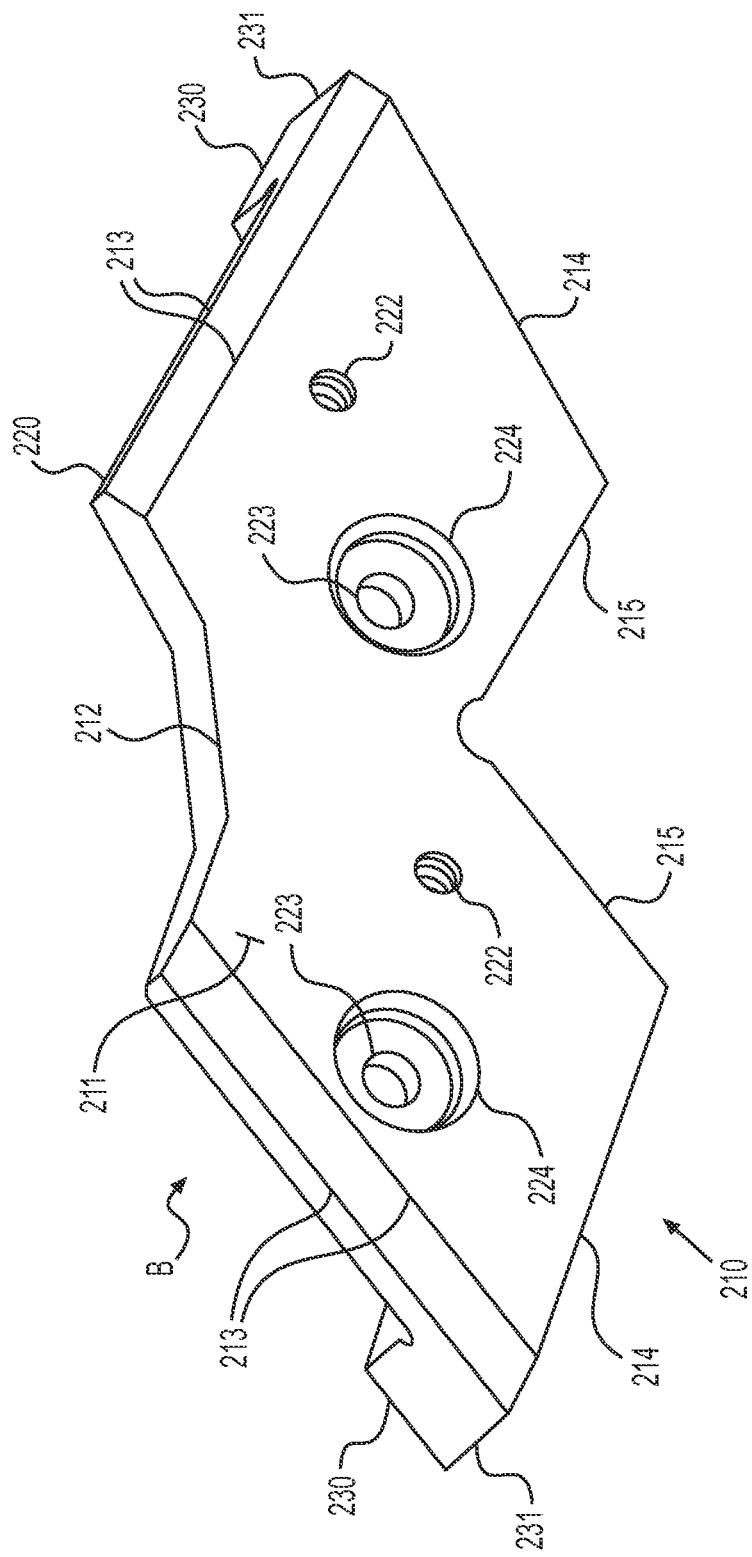
FIG. 7 is another perspective of one of the bolt-on piercing tips of FIG. 1.

With reference to FIG. 1, and FIGS. 6 and 7 which show a tip 210 by itself, the tip 210 comprises a central portion 220 separating two distal cutting portions 230. In the illustrated embodiment, the tip 210 comprises a plane of symmetry S (see FIG. 6). Most of the features of tip 210, including cutting portions 230, are symmetrical about the plane of symmetry S, i.e. one half of tip 210 on one side of plane S is a mirror image of the other half of tip 210 on the other side of plane S. Symmetrical in this context does not require perfect symmetry of every feature. Indeed, some of the structures of piercing tip 210, such as fastening structures, may not be symmetrical at all. Other features may still be considered symmetrical about plane S if the tip still is able to function as described herein, even though the geometry of those features is not perfectly mirrored.

Central portion 220 and cutting portions 230 combine to form a generally flat and smooth outside surface 211 (see FIG. 7). Outside surface 211 can be described as "bowtie" shaped. The perimeter of outside surface 211 is defined by a concave pocket 212, which is formed in the central portion 220. Two forward edges 213 extend from the pocket 212 in the central portion 220 to each of the distal cutting portions 230. Each of the forward edges may optionally be chamfered, as shown, so as to form two forward edges 213. The cutting portions 230 include shearing edges 214 which intersect at one end thereof with forward edges 213 at an angle between approximately 50 and 70 degrees, or more preferably, between approximately 55 and 65 degrees, or more preferably an angle of approximately 60 degrees. The other end of shearing edges 214 intersects a pair of back edges 215 formed in the central portion 220. The back edges intersect each other to form an obtuse angle. The outside surface 211 of tip 210 can be described as "bowtie" shaped because the width of outside surface 211 measured between the intersection of back edges 215 and the pocket 212 is less than the width measured from the intersections of back edges 215 with shearing edges 214 and the intersection of forward edges 213 with pocket 212.

Central portion 220 also comprises an inside surface 221 (see FIG. 6) opposite from the outside surface 211. Cutting portions 230 are elevated from inside surface 221, preferably at least twice the thickness of central portion 220. Cutting portions 230 each include a piercing edge 231. Each of the piercing edges 231 intersect a respective one of the forward edges 213 at approximately right angles. Cutting portions 230 are generally elongated in one direction, forming the piercing edges 231 on one end thereof, and fillet ends 232 at another opposite end thereof in the direction of elongation. Fillet ends 232 form a generally gradual and smooth fillet for effective load transfer to the upper jaw assembly 100.

Figure 4:
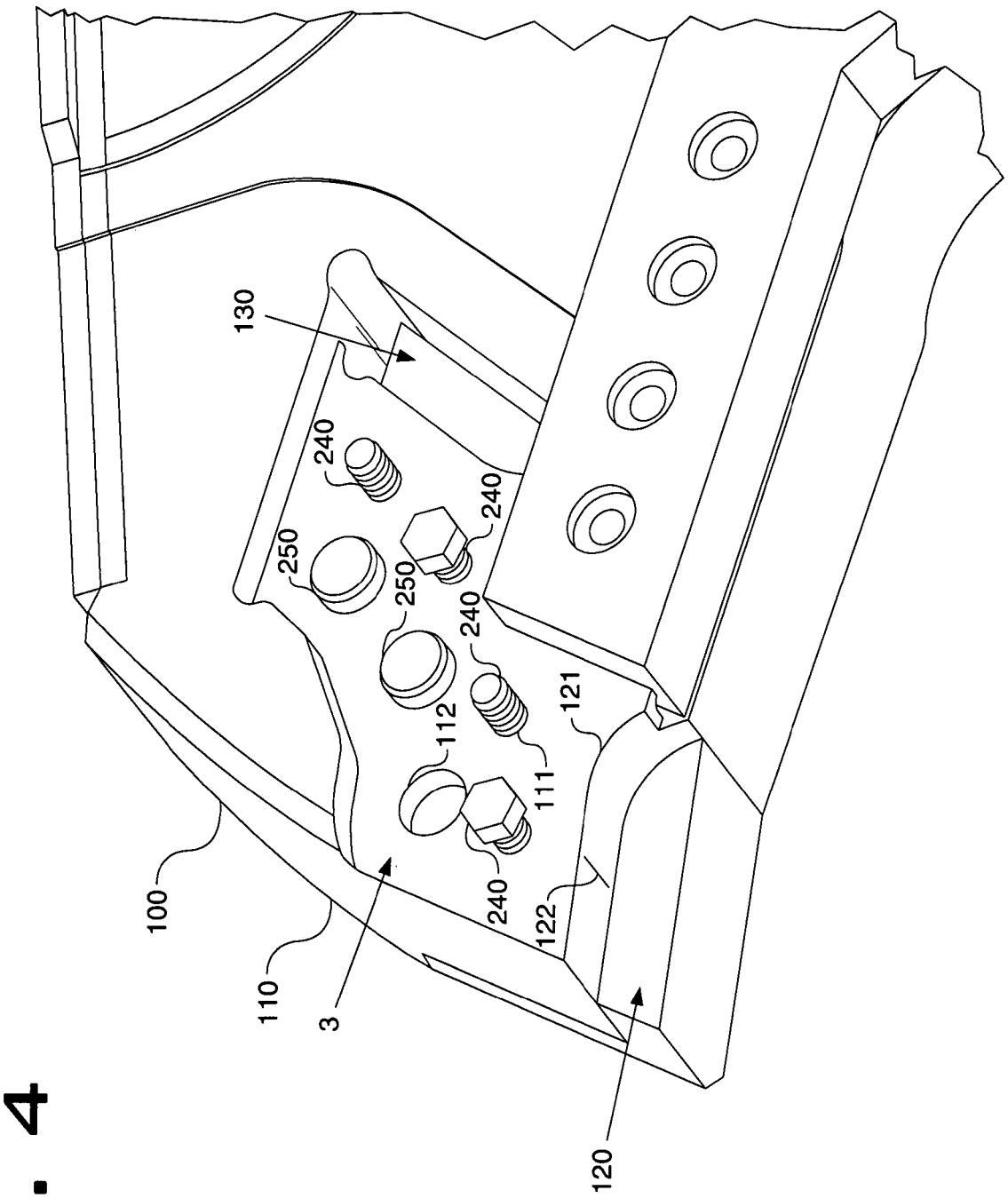
FIG. 4 is a partially assembled view of the jaw of FIG. 1, with only the right side bolt-on piercing tip attached.
Figure 5:
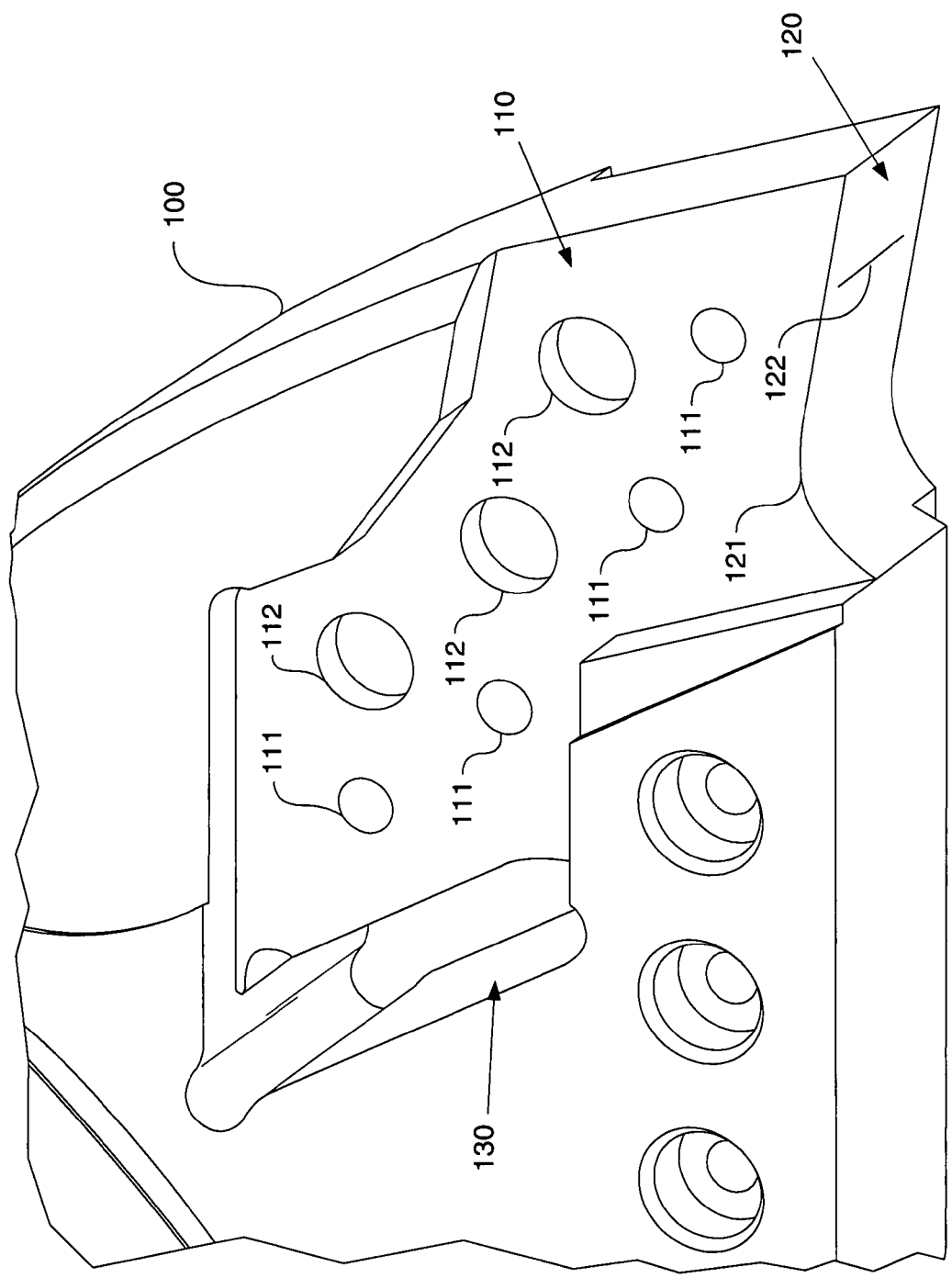
FIG. 5 is a close-up view of the right side of the jaw of FIG. 1, revealing the mounting location where the right side bolt-on piercing tip attaches to the jaw.

FIGS. 4 and 5 illustrate the upper jaw assembly 100 where the piercing tips 210 mount thereto. The upper jaw assembly 100 includes a central portion mounting pad 110 on each side thereof which corresponds in shape to the central portions 220 of piercing tips 210. The upper jaw assembly 100 includes a left side central portion mounting pad 110 (shown in FIGS. 1 and 4), and a right side central portion mounting pad 110 (shown in FIG. 5). Each central portion mounting pad 110 may be a mirror image of the other. Each central portion mounting pad 110 has a general "bowtie" shape, similar to and defined in a similar fashion as the outside surfaces 211 of tips 210. The central portion mounting pad 110 is recessed from the other exterior surfaces of upper jaw assembly 100 a depth approximately equivalent to the thickness of the central portions 220 of piercing tips 210.

The upper jaw assembly 100 also includes a forward cutting portion receiving pocket 120 and an aft cutting portion receiving slot 130. In the illustrated embodiment, each of the forward cutting portion receiving pocket 120 and the aft cutting portion receiving slot 130 is formed all the way through the thickness of the upper jaw assembly 100. The forward cutting portion receiving pocket 120 includes a rear fillet 121 which generally matches the radius of fillet ends 232 of piercing tips 210. The forward cutting portion receiving pocket 120 also defines an upper cutting surface 122 which is approximately parallel to the axis of rotation of upper jaw assembly 100 when it rotates to shear material against a lower jaw. The aft cutting portion receiving slot 130 in the illustrated embodiment comprises a through slot formed all the way through the thickness of the upper jaw assembly 100.

The piercing tips 210 are received in the left and right side central portion mounting pads 110, the forward cutting portion receiving pocket 120 and the aft cutting portion receiving slot 130 during operation of the metal shears. One set of cutting portions 230 is received in the forward cutting portion receiving pocket 120 and becomes the active set. The other set of cutting portions 230 is received in the aft cutting portion receiving slot 130 and becomes the inactive set. The piercing edges 231 and shearing edges 214 of the active set act to pierce and shear the metal held between the jaws of the metal shears. When the piercing edges 231 and shearing edges 214 of the active set become dull after a period of use, the piercing tips 210 can be reversed to move the inactive set of cutting portions 230 received in the aft cutting portion receiving slot 130, to the forward cutting portion receiving pocket 120 to become the new active set. To reverse the piercing tips 210, each of the right and left side tips are detached from the upper jaw assembly 100. The tip from the right side is flipped and moved to the left side, and the tip from the left side is flipped and moved to the right side.

In the illustrated embodiment, the piercing tip assembly 200 comprises two separate, but mirror image piercing tips 210, an "A" version and its negative a "B" version. This is best perceived by the view in FIG. 1. Also, FIG. 6 shows the "A" version, while FIG. 7 shows the "B" version. Both an "A" version and a "B" version of the piercing tip 210 are attached to each upper jaw assembly 100. As described above, each of the "A" and "B" versions can be mounted to and reversed between the left and right side of the upper jaw assembly 100. Because each "A" version is a mirror image of the "B" version, the costs of development and manufacturing are minimized.

Each piercing tip 210 can be mounted via mechanical fasteners such as bolts. Those of ordinary skill in this art will be able to specify an appropriate fastening system appropriate for a particular type of shear or other environmental factors. In the illustrated fastening system, two bolts 240 pass through each of the piercing tips 210, through the upper jaw assembly 100, and thread into the piercing tip 210 on the opposite side thereof. To accomplish this, each piercing tip 210 central portion 220 is provided with a pair of through threaded holes 222, and a pair of through countersunk holes 223. The countersinks 224 are formed on the outside surfaces 211 of the piercing tips 210. The central portion mounting pad 110 of the upper jaw assembly is provided with four through holes 111 through which bolts 240 pass. FIG. 4 shows the bolts 240 as they would be positioned when both piercing tips 210 are mounted. An advantage of this arrangement is that no threaded holes are needed in the upper jaw assembly 100. If any of the threaded holes 222 become damaged, they are repaired easily by replacing piercing tips 210.

To assist in force transfer from the piercing tips 210 to the upper jaw assembly 100, dowel pins 250 may optionally be provided. Dowel pins 250 are received by the piercing tips 210 in blind dowel holes 225 formed on the inside surface 221 of central portion 220. Dowel pins 250 are also received by the upper jaw assembly 100 in blind dowel holes 112.

Depending upon the fastening system, any through threaded holes, through countersunk hoes, dowel holes, or the like may not be perfectly symmetrical about the plane of symmetry S. In describing the symmetry of the piercing tips 210, the piercing tips may still considered symmetrical even though some variations may exist because of the arrangement of the fastening system structure. Likewise, in describing the mirror image relationship of the separate "A" and "B" versions of piercing tip 110 to one another, the versions may still be considered to be mirror images of one another even though some variations may exist because of the arrangement of the fastening system structure.

Figure 2:
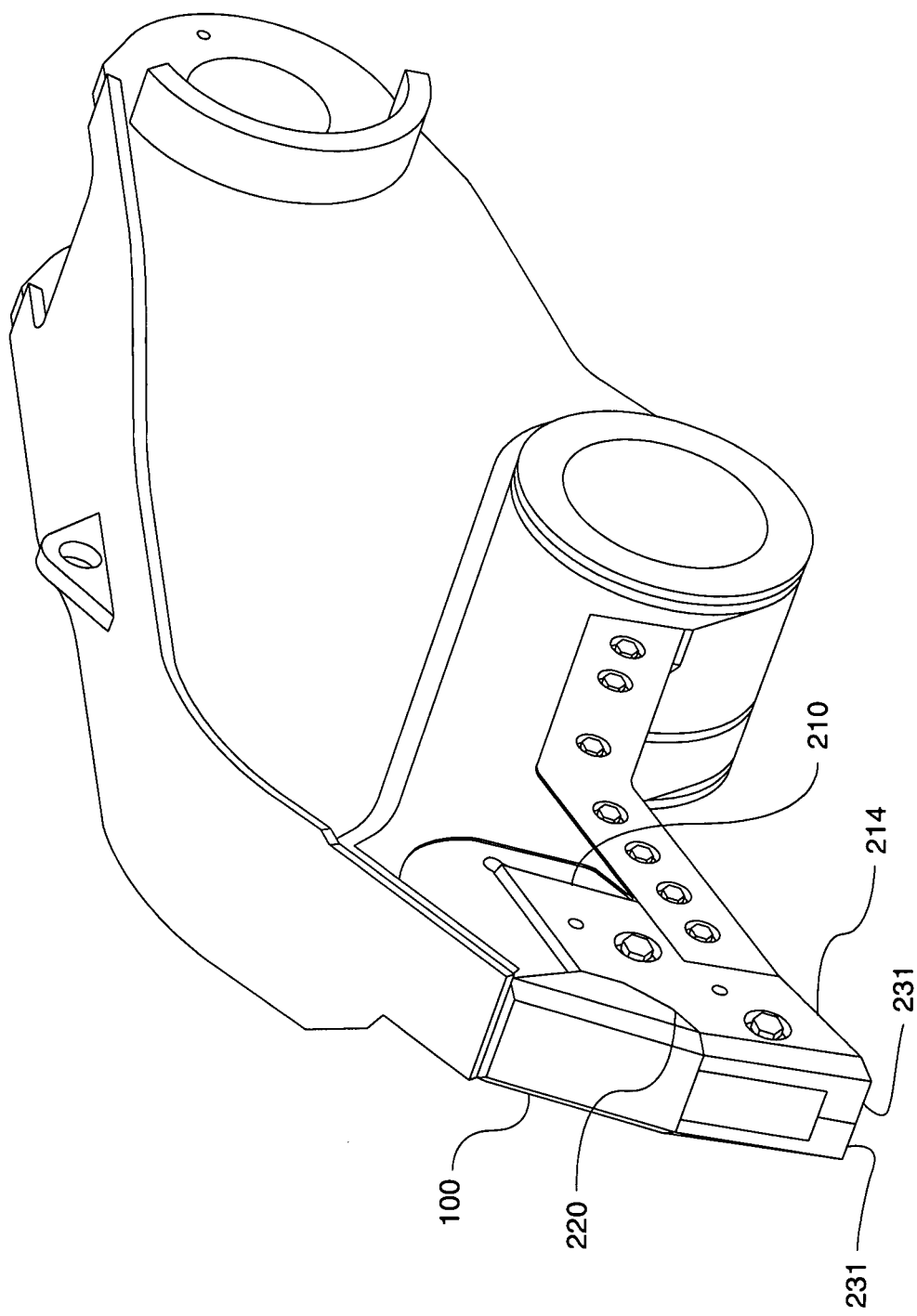
FIG. 2 is an assembled view of the upper jaw and bolt-on piercing tips of FIG. 1.
Figure 3:
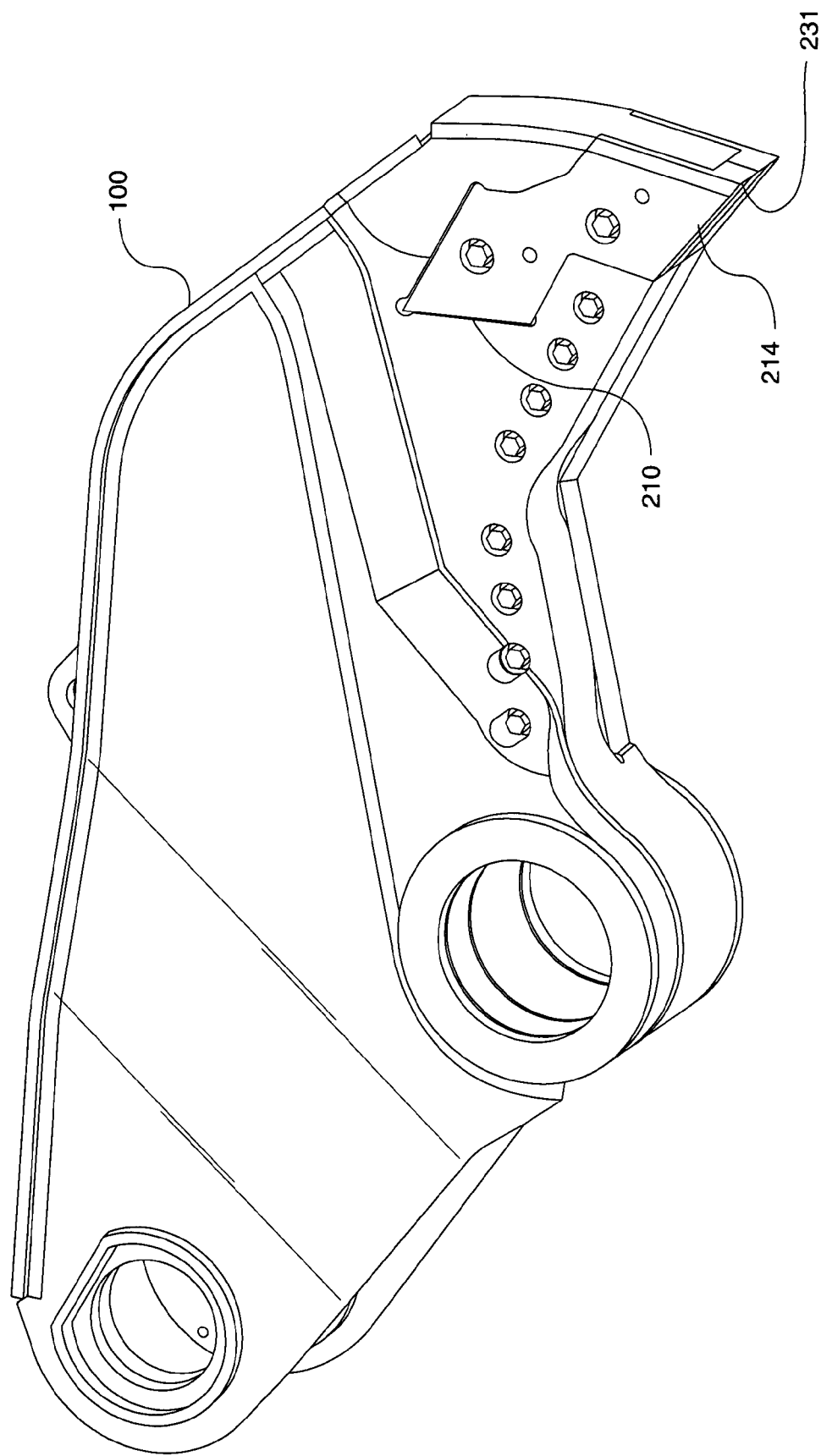
FIG. 3 is another assembled view like FIG. 2, taken from a different angle and showing the right side of the jaw rather than the left side.

When mounted to the upper jaw assembly 100, piercing tips 210 provide protection against wear which would otherwise degrade and shorten the life of upper jaw assembly 100. As seen in FIGS. 2 and 3, the cutting portions 230 of piercing tips 210 completely cover the upper cutting surface 122. The cutting portions 230 of each of the left side and right side piercing tips each cover about half of the upper cutting surface 122 in the illustrated embodiment. But it may also be possible to construct piercing tips 210 so that the tip on side of the jaw covers more than half the upper cutting surface 122, and the tip on the other side less than half. The central portions 220 of piercing tips 210 also extend from the upper cutting surface 122 upwards to protect the left and right sides of upper jaw assembly 100.

INDUSTRIAL APPLICABILITY

The piercing tip described and illustrated herein finds industrial applicability in metal shears or similar tools for shearing scrap metal and other materials, in industrial processes such as scrap recycling and demolition of structures.

We claim:

1. A piercing tip for metal shears comprising:
   a central portion joining two distal cutting portions, the two cutting portions each having a piercing edge and a shearing edge;
   a plane of symmetry defined by the central portion and the two cutting portions and passing through the central portion, wherein the two cutting portions are symmetrical about the plane of symmetry;
   a generally planar outside surface defined by each of the central portion and the two cutting portions;
   an inside surface formed on the central portion opposite the outside surface, wherein the cutting portions are each elevated above the inside surface in a direction away from the outside surface;
   wherein each cutting portion is elongated and defines the piercing edge at one end thereof and a fillet end at the opposite end thereof in a direction of the elongation;
   wherein the generally planar outside surface formed by the central portion and the two cutting portions is bowtie-shaped; and
   wherein the perimeter of the outside surface is defined by a concave pocket formed in the central portion, two forward edges extending from the concave pocket, the shearing edge of each of the two cutting portions intersecting with a respective one of the forward edges, and a pair of back edges, each back edge intersecting with a respective one of the shearing edges, and wherein an obtuse angle is formed between the pair of back edges.

2. The piercing tip according to claim 1 further comprising:
   a pair of countersunk through holes in the central portion, where the pair of countersunk through holes are asymmetric about the plane of symmetry.

3. The piercing tip according to claim 1 further comprising:
   a pair of threaded through holes in the central portion, where the pair of threaded through holes are asymmetric about the plane of symmetry.

4. The piercing tip according to claim 1 further comprising:
   a pair of countersunk through holes in tile central portion, where the distance between one of the pair of countersunk through holes and one of the two forward edges is greater than the distance between the other one of the pair of countersunk through holes and the other one of the two forward edges.

5. The piercing tip according to claim 1 further comprising:
   a pair of threaded through holes in the central portion, where the distance between one of the pair of threaded through holes and one of the two forward edges is greater than the distance between the other one of the pair of threaded through holes and the other one of the two forward edges.

6. The piercing tip according to claim 1 wherein the bowtie-shaped outer surface comprises a width of the piercing tip measured along the plane of symmetry being less than a width of the piercing tip measured from one of the intersections of the shearing edges and the back edges that is located on one side of the plane of symmetry to one of the intersections between the forward edges and the concave pocket that is located on said one side of the plane of symmetry.

* * * * *